United States Patent [19]

Gehring

[11] Patent Number: 5,048,872
[45] Date of Patent: Sep. 17, 1991

[54] FITTING FOR CABLES, TUBES AND THE LIKE

[75] Inventor: Peter Gehring, Simonswald-Griesbach, Fed. Rep. of Germany

[73] Assignee: Anton Hummel GmbH Metallwarenfabrik, Waldkirch, Fed. Rep. of Germany

[21] Appl. No.: 474,287

[22] Filed: Feb. 2, 1990

[30] Foreign Application Priority Data

Feb. 4, 1989 [DE] Fed. Rep. of Germany ....... 3903354

[51] Int. Cl.[5] .............................................. F16L 55/00
[52] U.S. Cl. ...................................... 285/92; 285/322; 411/269
[58] Field of Search ........................ 285/322, 323, 92; 411/269, 268, 433

[56] References Cited

U.S. PATENT DOCUMENTS

| 4,145,075 | 3/1979 | Holgman | 285/322 X |
| 4,250,348 | 2/1981 | Kitagawa | 285/322 X |
| 4,767,135 | 8/1988 | Holgman | 285/322 X |
| 4,787,657 | 11/1988 | Heminger | 285/323 |

FOREIGN PATENT DOCUMENTS 2631996 11/1979 Fed. Rep. of Germany.
384700 12/1932 United Kingdom ................ 285/322

Primary Examiner—Dave W. Arola
Assistant Examiner—Heather Chun
Attorney, Agent, or Firm—Peter K. Kontler

[57] ABSTRACT

A fitting for cables, tubes and like parts has an externally threaded sleeve one end portion of which is constituted by an annulus of deformable axially extending prongs alternating with slots. The radially outer ends of the slots are offset with reference to the radially inner ends in the same direction circumferentially of the sleeve. The nut of the fitting has an internally threaded end portion and a frustoconical deforming surface which deforms the prongs radially inwardly when the nut is screwed onto the sleeve. The deforming surface is provided with one or more male and/or female detent elements each having a blocking flank which engages an adjacent deformed prong in response to attempted unscrewing of the nut. The inclination of the blocking flank or flanks matches or approximates the inclination of the slots, at least when the nut meshes with and its internal surface deforms the prongs of the sleeve.

20 Claims, 2 Drawing Sheets

FITTING FOR CABLES, TUBES AND THE LIKE

BACKGROUND OF THE INVENTION

The invention relates to fittings in general especially fittings which to surround and clamp cables, tubes, hoses and like parts. More particularly, the invention relates to improvements in fittings of the type wherein a nut can be screwed onto a sleeve to thereby deform prongs at one axial end of the sleeve in order to urge the deformed prongs against the sheath of a cable, against the external surface of a tube or hose, or against the external surface of another confined part.

German Pat. No. 26 31 996 discloses a fitting wherein a nut has an internal deforming surface serving to deflect radially inwardly portions of prongs at one end of a sleeve in response to screwing of the nut onto the sleeve. The patented fitting further comprises means for preventing unintentional or accidental unscrewing of the nut, e.g., in response to vibration of the structure (such as an engine, a machine or the like) on or in which the sleeve is mounted. The means for preventing unintentional unscrewing of the nut includes several radially extending teeth which project inwardly beyond the deforming surface and penetrate between the adjacent radially inwardly deformed prongs. The slots between the prongs of the sleeve do not extend radially of the sleeve; therefore, each radially inwardly deformed prong is in mere point contact with the adjacent tooth of the nut. This does not suffice to generate a force which invariably and reliably prevents accidental (unintentional) unscrewing of the nut. On the other hand, it is often desirable or absolutely necessary to maintain the nut in a selected axial position in which the deformed prongs are held in pronounced frictional engagement with the part (such as a cable, a conductor, a hose, a pipe or a tube) which extends into the sleeve and is surrounded by the prongs.

OBJECTS OF THE INVENTION

An object of the invention is to provide a fitting wherein the means for preventing accidental or unintentional unscrewing of the nut is more reliable than, but just as simple as, heretofore known preventing means.

Another object of the invention is to provide a fitting wherein the resistance to accidental or unintentional unscrewing of the nut increases with the extent of screwing of the nut onto the sleeve.

A further object of the invention is to provide a novel and improved nut for use in the above outlined fitting.

An additional object of the invention is to provide a fitting wherein the resistance to accidental or unintentional unscrewing of the nut can be selected in advance with a high degree of accuracy and reproducibility.

Still another object of the invention is to provide a simple and inexpensive fitting which embodies the above outlined nut and the above outlined preventing means and can be used with advantage for reliable clamping of cables, conductors, tubes, hoses, pipes and/or other parts.

A further object of the invention is to provide a novel and improved method of preventing accidental or unintentional unscrewing of the nut from the sleeve of the above outlined fitting.

SUMMARY OF THE INVENTION

One feature of the present invention resides in the provision of a fitting for cables, tubes and the like. The improved fitting comprises a first component which constitutes a sleeve including an externally threaded portion and an end portion having substantially axially extending deformable prongs and substantially axially extending slots which alternate with the prongs. The radially outer ends of the slots are offset relative to the radially inner ends in the same direction circumferentially of the sleeve so that the slots are inclined relative to and are intersected by planes which include the axis of the sleeve and extend between the respective radially inner and outer ends. The fitting further comprises a second component which constitutes a nut including an internally threaded portion which is to mate with the externally threaded portion of the sleeve. The nut has an internal deforming surface which is designed to displace portions of the prongs substantially toward the axis of the sleeve in response to screwing of the nut onto the sleeve. The deforming surface has at least one detent element which cooperates with at least one of the prongs to oppose unscrewing of the nut. The at least one detent element is substantially or exactly parallel to an adjacent slot when the two threaded portions mesh.

The nut is preferably provided with a central opening, and the deforming surface of the nut is preferably a substantially frustoconical surface which is disposed between the internally threaded portion of the nut and the opening and tapers toward the opening.

In accordance with one presently preferred embodiment, the at least one detent element includes or constitutes a tooth having a blocking flank which penetrates into a slot between two neighboring prongs in response to attempted unscrewing of the nut. Alternatively, the at least one detent element can be provided with or can constitute a recess and the nut then comprises a blocking flank which is provided in the recess and engages the at least one prong in response to attempted unscrewing of the nut. Thus, irrespective of whether the detent element is a male detent element (such as a tooth) or a female detent element (such as one having a recess), the nut is provided with a blocking flank which engages the at least one prong in response to attempted unscrewing of the nut.

The arrangement may be such that the at least one detent element is inclined with reference to an adjacent slot in substantially undeformed condition of the prongs. Such situation (prongs in undeformed condition) develops when a person or an automaton begins to screw the nut onto the sleeve.

A plane which includes the axis of the nut and the radially inner end of the detent element makes with the detent element a first angle, and a plane which includes the axis of the sleeve and the radially inner end of any one of the slots can make with the respective slot a smaller second angle in undeformed condition of the prongs. Alternatively, a plane which includes the axis of the nut and the radially inner end of the blocking flank of the nut makes with the flank a first angle which is smaller than the angle between a plane including the axis of the sleeve and the radially inner end of any slot and the respective slot when the prongs are undeformed or practically undeformed.

The deforming surface of the nut can have a plurality of (e.g., two) detent elements. The likelihood that at least one of plural detent elements will effectively oppose unscrewing of the nut is increased if the angle between a plane including the axis of the nut and the radially inner end of one of, for example, two detent elements and the one detent element is different from the angle between a plane including the axis of the nut and the radially inner end of the other detent element and such other detent element.

The height of the blocking flank can vary in the radial direction of the nut. It is preferred to design the blocking flank in such a way that its height increases in a direction toward the axis of the nut.

The blocking flank is preferably undercut to enhance the blocking action of the at least one detent element in response to attempted unscrewing of the nut.

If the at least one blocking element is a tooth, such tooth further includes a second flank and a top land, and the two flanks preferably converge toward each other in a direction from the root toward the top flank of the tooth, i.e., from the deforming surface toward the top land. If the detent element has a recess, the two flanks which bound the recess preferably converge toward each other in a direction toward the deepmost portion of the recess.

At least one of the two components can consist of an elastomeric material, e.g., a plastic material.

Another feature of the invention resides in the provision of a fitting for tubes, cables and the like. This fitting comprises a sleeve including an externally threaded portion and an end portion having substantially axially extending deformable prongs and substantially axially extending slots which alternate with the prongs. The fitting further comprises a nut including an internally threaded portion which serves to mesh with the externally threaded portion of the sleeve. Furthermore, the nut has an internal deforming surface which is operative to displace portions of the prongs substantially toward the axis of the sleeve in response to screwing of the nut onto the sleeve. The deforming surface has at least one recess which receives a portion of one of the prongs in response to attempted unscrewing of the nut. Such nut has a blocking flank which is provided in the recess and engages the one prong in response to attempted unscrewing of the nut.

The novel features which are considered as characteristic of the invention are set forth in particular in the appended claims. The improved fitting itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
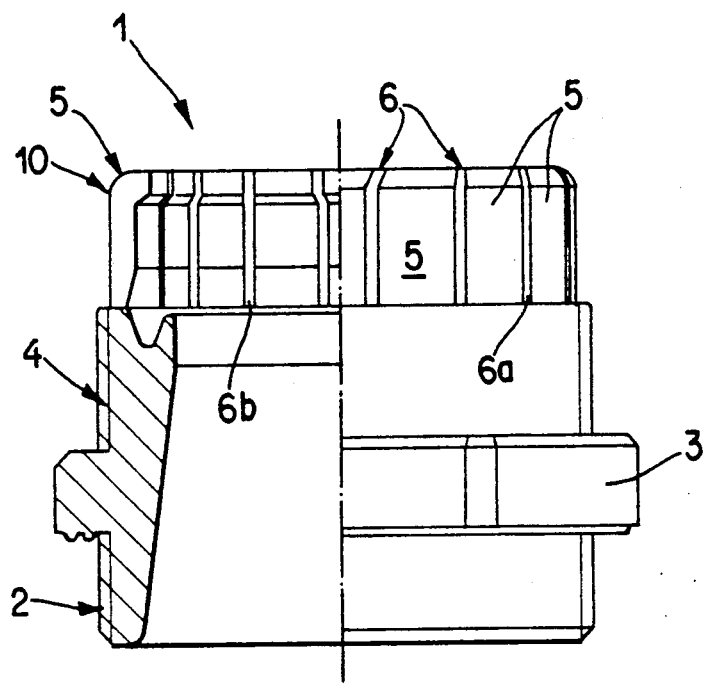
FIG. 1 is a partly elevational and partly axial sectional view of a sleeve constituting one component of the improved fitting.
Figure 2:
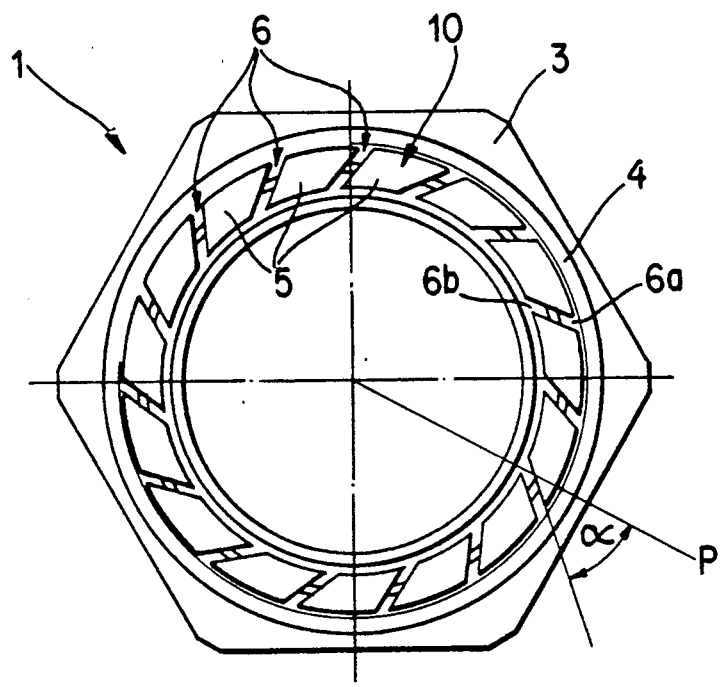
FIG. 2 is an end elevational view of the sleeve as seen from the upper side of FIG. 1.

FIGS. 1 and 2 show a cylindrical sleeve 1 which constitutes one component of the improved fitting and includes an externally threaded first end portion 2, a hexagonal collar 3 adjacent the end portion 2, an externally threaded intermediate portion 4, and a second end portion consisting of an annulus of axially parallel deformable prongs 5 alternating with axially extending slots 6. The end portion 2 can be screwed into a tapped bore or hole of a machine, engine or any other structure wherein or whereon a cable, a hose, a tube, a conductor, a pipe or a like part is to be attached to one or more other parts and/or held against stray movements in the axial and/or radial direction of the sleeve 1. The latter can be made of a relatively hard elastomeric material, e.g., a suitable plastic material. The prongs 5 preferably constitute integral portions of the major portion or section of the sleeve 1.

As can be seen in FIG. 2, the inclination of the slots 6 is such that the radially outer end 6a of each slot is offset with reference to the radially inner end 6a in the same direction, as seen circumferentially of the sleeve 1. Thus, a plane P which includes the axis of the sleeve 1 and is disposed between the radially inner and outer ends 6b, 6a of any one of the slots 6 makes with the respective slot an acute angle alpha. The just described inclination of the planes of slots 6 is desirable and advantageous because it facilitates radially inward deformation of the free end portions 10 of the prongs 5 and ensures that the deformed prongs are maintained in large-area contact with each other. The deformed prongs 5 can reliably grasp and clamp the sheath of a cable or conductor, a tube, a hose or any other part which extends into and normally through and beyond the sleeve 1.

Figure 4:
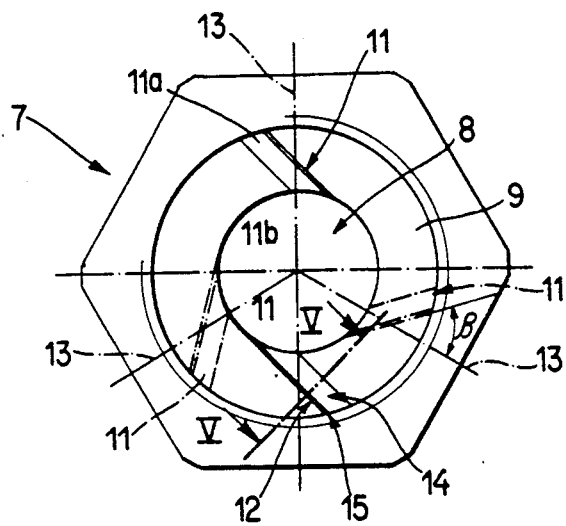
FIG. 4 is an end elevational view of the nut as seen in the direction of arrow IV in FIG. 3.
Figure 3:
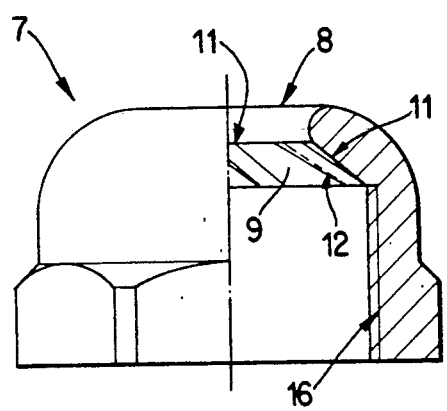
FIG. 3 is a partly elevational and partly axial sectional view of a nut which constitutes another component of the improved fitting.

FIGS. 3 and 4 show a nut 7 which constitutes another component of the improved fitting and includes an internally threaded first end portion 16, a preferably centrally located circular opening 8 in the second end portion and a substantially frusto-conical internal deforming surface 9 which is disposed between the opening 8 and the internally threaded portion 16 and serves to deform the free end portions 10 of the prongs 5 when the threaded portions 4 and 16 mate and the nut 7 is in the process of being screwed onto the sleeve 1. The illustrated nut 7 resembles a so-called cap nut or acorn nut and can be screwed onto the sleeve 1 to a desired extent in order to bring about a more or less pronounced radially inward deformation of the major portions of the prongs 5, i.e., in order to establish a more or less pronounced frictional clamping engagement between the radially innermost portions of the prongs 5 and the external surface of a cable, conductor, pipe, tube or any other part extending from the outside through the opening 8 and into the sleeve 1 or in the opposite direction.

A presently preferred purpose of the improved fitting including the sleeve 1 and the nut 7 is to prevent vibration of a cable which extends from the housing or body of an engine, a machine or another structure through the interior of the sleeve 1 and through the opening 8 of the nut 7. Moreover, the prongs 5 can serve to prevent unintentional axial shifting of the cable in response to the application of a pronounced axial stress. Thus, the prongs 5 can be deformed in order to ensure retention of the surrounded part against any stray movements in the axial and/or radial direction of the sleeve 1. All that is necessary is to screw the nut 7 onto the sleeve 1 to an extent which suffices to ensure that the inner sides of the radially inwardly deformed portions of the prongs 5 will remain in reliable frictional clamping engagement with the confined cable, tube or other part.

Figure 5:
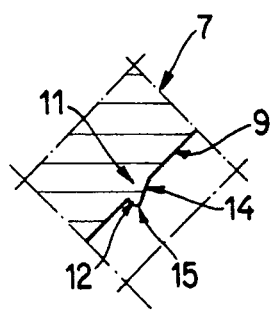
FIG. 5 is an enlarged fragmentary axial sectional view of the nut, substantially as seen in the direction of arrows from the line V—V of FIG. 4.
Figure 6:
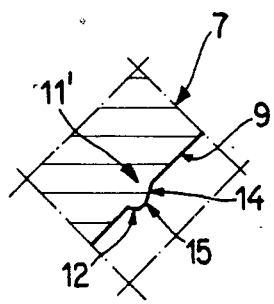
FIG. 6 is a similar fragmentary axial sectional view of a modified nut.
Figure 7:
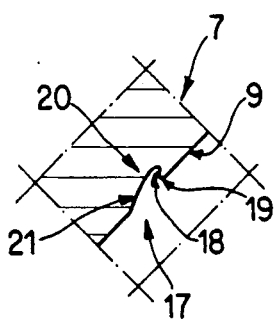
FIG. 7 is a similar fragmentary axial sectional view of a third nut.
Figure 8:
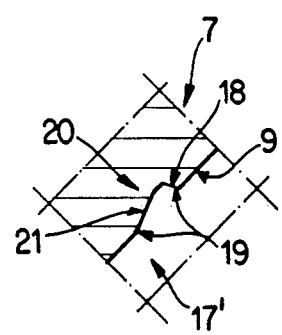
FIG. 8 is a similar fragmentary axial sectional view of a fourth nut.

In accordance with a feature of the invention, the deforming surface 9 of the nut 7 is provided with at least one but preferably two or more male detent elements 11 or 11' (see particularly FIGS. 5 and 6) and/or with one but preferably two or more female detent elements 17 or 17' (FIGS. 7 and 8). Referring first to FIGS. 3, 4 and 5, the nut 1 can be provided with a plurality of elongated tooth-shaped male detent elements 11 each of which resembles a saw tooth (FIG. 5) and each of which preferably extends all the way from the opening 8 to the adjacent inner end of the internally threaded portion 16. The height of each male detent element 11 (hereinafter called tooth for short) increases in the radial direction of the nut 7, namely in a direction toward the axis of the nut (that is, from the adjacent inner end of the internally threaded portion 16 toward the opening 8). Each tooth 11 has a blocking flank 12 which engages the adjacent prong 5 of the sleeve 1 in response to attempted unscrewing of the nut 7 to thus oppose further unscrewing unless a person desiring or the implement serving to unscrew the nut applies a force which suffices to cause the blocking flank 12 to ride over successive prongs 5 while the nut is being unscrewed from the externally threaded intermediate portion 4 of the sleeve 1.

An even more satisfactory blocking action is obtained if the blocking flank 12 of at least one tooth 11 on the deforming surface 9 of the nut 1 is undercut. This is intended to be shown in FIG. 5, i.e., the flank 12 is slightly concave to thus ensure even more reliable and more pronounced blocking engagement with an adjacent prong 5 in response to attempted unscrewing of the nut 7. The other or second flank 14 of each tooth 11 converges toward the blocking flank 12 in a direction toward the top land 15 of the respective tooth, i.e., in a direction away from the root at the deforming surface 9. The top land 15 slopes toward the adjacent portion of the deforming surface 9 in a direction from the opening 8 toward the inner end of the internally threaded portion 16 of the nut 7.

In order to even further enhance the blocking action of each flank 12, the orientation of each tooth 11 is preferably such that its inclination matches or approximates the inclination of the adjacent slot 6 when the internally threaded portion 16 mates with the externally threaded portion 4, at least when the free end portions 10 of the prongs 5 are already shifted radially inwardly toward the axis of the sleeve 1. As can be seen in FIG. 4, the radially outer ends 11a of the teeth 11 are offset with reference to the respective radially inner ends 11b in the same direction circumferentially of the nut 7 so that a plane 13 which includes the axis of the nut and is disposed between the inner and outer ends 11b, 11a of a tooth 11 makes with the respective blocking flank 12 an acute angle beta which equals or approximates the aforementioned angles alpha. The offset of outer ends 11a relative to the respective inner ends 11b is in the same direction as the offset of the outer ends 6a relative to the respective inner ends 6a when the internally threaded portion 16 of the nut 7 meshes with the externally threaded portion 4 of the sleeve 1. This ensures that each blocking flank 12 is in pronounced surface-to-surface contact with the adjacent prong 5 when it counts, namely when the prongs are deformed and the nut 7 tends to turn in a direction to be unscrewed from the sleeve 1. In fact, each blocking flank 12 is or can be in full surface-to-surface contact with the adjacent deformed prong 5 all the way from the internally threaded portion 16 to the opening 8 of the nut 7 when the latter tends to turn in a direction to become separated from the sleeve 1. This is in contrast to the mere point contact between the prongs and the teeth in the aforediscussed conventional fitting.

It is presently preferred to select the inclination of the blocking flanks 12 in such a way that it exceeds the inclination of the adjacent slots 6 in undeformed condition of the prongs 5. This is desirable on the ground that, when the prongs 5 are in the process of being deformed by the internal surface 9 as a result of screwing of the nut 7 onto the sleeve 1, the inclination of the slots 6 increases, i.e., the inclination of the slots 6 can match the inclinations of the adjacent blocking flanks 12 in response to a predetermined deformation of the prongs 5. This even further enhances the ability of the teeth 11 to effectively oppose undesirable or unintentional unscrewing of the nut 7, e.g., in response to vibration of the fitting when a machine, an engine or another structure employing the improved fitting is in use.

Still further, the inclination of the blocking flanks 12 is preferably selected in such a way that it fully matches the inclination of the adjacent slots 6 only in response to attempted unscrewing of the nut 7. Such attempted unscrewing entails a deformation of those prongs 5 which are engaged by the adjacent blocking flanks 12, and this deformation of the prongs entails a more pronounced surface-to-surface contact between each flank 12 and the adjacent prong 5 to thus further enhance the ability of the teeth 11 to oppose unscrewing of the nut 7. Attempted unscrewing of the nut 7 results in more pronounced inclination of the slots 6 due to a displacement of the prongs 5 in the circumferential direction of the sleeve 1. The area of contact between each flank 12 of the just described nut 7 and the adjacent prong 5 increases in response to intensification of the force which tends to unscrew the nut.

If the internal surface 9 carries two or more teeth 11, the inclination of each slot 6 with reference to the respective radial plane 13 is preferably different. This not only compensates for manufacturing tolerances but also ensures that at least one of two or more blocking flanks 12 is invariably in optimum surface-to-surface engagement with the adjacent prong 5 (i.e., in a position of exact parallelism with the adjacent slot 6) when the nut 7 tends to turn in a direction to become unscrewed from the sleeve 1.

The feature that the height of each blocking flank 12 increases in a direction from the internally threaded portion 16 toward the opening 8 also contributes to the establishment of a more reliable blocking action because the extent to which the end portions 10 of the prongs 5 are shifted relative to each other at the opening 8 is greater than in regions nearer to the internally threaded portion 16. Widening or heightening of blocking flanks 12 in a direction toward the opening 8 contributes significantly to the ability of such flanks to offer a pronounced resistance to unscrewing of the nut 7 when the end portions 10 of the prongs 5 have completed a pronounced displacement radially toward the axis of the sleeve 1. The shape of the blocking flanks 12 then closely conforms to the shape of those portions of lateral surfaces of the adjacent prongs 5 which are not overlapped and are free to engage the respective blocking flanks in response to attempted unscrewing of the nut 7.

The top lands 15 of the teeth 11 are or can be flattened so that they are substantially parallel to adjacent portions of the deforming surface 9. The flanks 14 slope gradually so that each tooth 11 has a substantially sawtooth profile with the steep (and preferably undercut) flank 12 constituting the blocking flank. The feature that the blocking flanks 12 of the teeth 11 are undercut enables these teeth to establish form-locking connections with the adjacent deformed prongs 5 in response to attempted unscrewing of the nut 7. Such undercutting prevents the engaged prongs 5 from yielding in the radial direction of the sleeve 1 and from becoming disengaged from the adjacent blocking flanks 12 except, of course, in response to the application of a pronounced force which suffices to rotate the nut 7 relative to the sleeve 1 against the opposition of the teeth 11.

FIG. 6 shows a modified tooth 11' which can be used in addition to or in lieu of one or more teeth 11. The main difference between the tooth 11 of FIG. 5 and the tooth 11' of FIG. 6 is that the blocking flank 12 of the tooth 11' slopes rather gently toward the rounded top land 15 without the formation of a pronounced edge such as that between the flank 12 and the top land 15 of FIG. 5. This reduces the likelihood of damage to those edges of prongs 5 which are engaged by the blocking flanks 12 of teeth 11' in response to repeated screwing and unscrewing of a nut 7 having one or more teeth 11' of the type shown in FIG. 6. The flank 12 of FIG. 6 is not undercut; in fact, it is or it can be slightly convex and it slopes toward the other flank 14 all the way from the root to the top land 15 of the tooth 11'. The height of the tooth 11' is or can be greater than that of the tooth 11 of FIG. 5; this can compensate for the absence of an undercut in the flank 12 of FIG. 6, i.e., a nut 7 having one or more teeth 11' is still capable of reliably maintaining the prongs 5 in deformed condition unless the operator decides to unscrew the nut by overcoming the resistance of teeth 11' to movement over the adjacent prongs 5 in response to rotation of the nut 7 in a direction to become separated from the sleeve 1. The second flank 14 of the tooth 11' is substantially flat in contrast to the slightly convex flank 14 of the tooth 11 of FIG. 5.

As mentioned above, the detent elements at the internal deforming surface 9 of the nut 7 can include recesses or sockets in lieu of or in addition to tooth-shaped male detent elements 11 or 11'. A recess 17 is shown in FIG. 7; this recess by an undercut concave blocking flank 18 and a gently sloping second flank 21. The flanks 18 and 21 diverge in a direction from the deepmost portion 20 of the recess 17 toward the internal deforming surface 9 of the nut which embodies the structure of FIG. 7. When the nut tends to become unscrewed from the sleeve, an edge portion of the adjacent deformed prong 5 penetrates into the recess 17 and is engaged by the blocking flank 18 to thus exhibit a pronounced resistance to further unscrewing of the nut. The edge 19 between the undercut blocking flank 18 and the surface 9 is or can be relatively sharp to more readily penetrate into a slot 6 which is adjacent the prong 5 extending into the recess 17 during attempted unscrewing of the nut. It can be said that the flank 18 of FIG. 7 is a functional equivalent of the flank 12 on the tooth 11 of FIG. 5.

FIG. 8 shows a portion of a nut having at least one modified female detent element with a recess 17' bounded by a flat or slightly convex blocking flank 18 and a more gently sloping second flank 21. The flanks 18, 21 of FIG. 8 converge toward each other in a direction toward the deepmost portion 20 of the recess 17'. These flanks can be said to constitute functional equivalents of the flanks 12, 14 on the tooth 11' of FIG. 6. The reference characters 19 denote the (not very pronounced) edges between the internal surface 9 and the flanks 18, 21 in the recess 17' of FIG. 8. The advantages of a detent element having the recess 17' of FIG. 8 are the same as those of the tooth 11', i.e., the flanks 18, 21 in the recess 17' are not likely to damage the edges of prongs 5 in response to repeated screwing of the nut 7 onto and unscrewing of the nut off the associated sleeve 1.

The inclination of the recesses 17, 17' relative to the prongs 5 and slots 6 (when the nut 7 embodying the structure of FIG. 7 or 8 is being screwed onto a sleeve 1) is or can be the same as described above in connection with the inclination of the teeth 11 or 11'. Thus, when the internally threaded portion 16 of the nut 7 mates with the respective externally threaded portion 4 of the sleeve 1, the inclination of the recesses 17 and 17' preferably matches or approximates the inclination of the adjacent slots 6, at least in deformed condition of the prongs 5.

It is also possible to provide the nut 7 with substantially radially extending recesses 17 or 17', especially if the slots 6 extend substantially radially of the sleeve 1.

An advantage of a nut which is provided with female detent elements is that such nut can be mass-produced at a lower cost than a nut which has one or more internal teeth (such as the tooth 11 of FIG. 5 or the tooth 11' of FIG. 6).

Each embodiment of the nut 7 exhibits the advantage that the magnitude of the blocking force (i.e., of a force which prevents unintentional unscrewing of the nut) can be selected in advance with a high degree of reliability as well as that, if desired, the maximum blocking force is much greater than that which can be achieved in conventional fittings. All that is necessary is to properly select the height of the teeth or the depth of the recesses, the inclination and configuration of the blocking flanks 12 or 18, the material of the sleeve and the material of the nut. The blocking force can also be controlled by appropriate selection of the mutual inclination of neighboring blocking flanks 12 or 18. As stated above, the inclination of two or more blocking flanks with reference to the adjacent slots 6 need not be the same if the maker of the nut wishes to ensure that at least one of the blocking flanks is in large surface-to-surface contact with the adjacent prong 5 irrespective of the extent of deformation of the prongs, i.e., in each of two or more different axial positions of the nut and sleeve relative to each other. The arrangement may be such that the number of blocking flanks 12 or 18 which are in full surface-to-surface contact with the adjacent prongs 5 increases in response to screwing of the nut onto the sleeve, i.e., in response to progressing deformation of the prongs.

Teeth 11' and/or recesses 17' will be utilized with particular advantage when it is intended to repeatedly unscrew the nut from and to repeatedly screw the nut back onto the sleeve. As mentioned above, the blocking flanks 12 of teeth 11' and the blocking flanks 18 in the recesses 17' are less likely to damage the adjacent prongs 5 during unscrewing of the nut 7 than the blocking flanks 12 of teeth 11 or the blocking flanks 18 in the recesses 17. The acute angle between a plane including the axis of the nut 7 and the radially inner end of the blocking flank 12 in a recess 17' and the respective blocking flank 18 preferably deviates from the acute angle between a slot 6 and the plane including the axis of the sleeve 1 and the radially inner end 6a of the respective slot 6. The same applies for mutual inclination of the blocking flank 12 on a tooth 11' and an adjacent slot 6.

When the prongs 5 are not deformed, the acute angle between a blocking flank 12 or 18 and a plane including the axis of the nut 7 and the radially inner end of the blocking flank is preferably somewhat greater than the angle between a slot 6 and the plane including the axis of the sleeve 1 and the radially inner end 6a of the respective slot. This is desirable if the manufacturer wishes to ensure the establishment of pronounced form-locking engagement between the blocking flanks and the adjacent deformed prongs 5 during attempted unscrewing of the nut.

However, if the nut is expected to be repeatedly unscrewed from and screwed back onto the sleeve, it is preferred to select the angle between a blocking flank and a plane including the radially inner end of this blocking flank and the axis of the nut 7 to be somewhat smaller than the acute angle between a slot 6 and a plane including the radially inner end of such slot and the axis of the sleeve 1 (in undeformed condition of the prongs).

An important advantage of the improved fitting is that the detent element or elements of the nut 7 can offer any desired resistance to unscrewing of the nut, e.g., a resistance which can be overcome only by destroying the prongs 5 or a selected lesser resistance, depending upon the intended use of the improved fitting and the anticipated magnitude of forces which tend to unscrew the nut 7 from the sleeve 1. The resistance of the blocking flank or flanks on one or more teeth (such as the teeth 11, 11') is or can be just as satisfactory as the resistance of the blocking flank or flanks 18 in the recesses 17 or 17'. A nut 7 can be provided with two or more identical teeth 11 or 11', with one or more teeth 11 and one or more teeth 11', with two or more identical recesses 17 or 17', with at least one recess 17 and at least one recess 17', as well as with one or more recesses and one or more teeth. It is clear that identical teeth or recesses will be preferred in most instances for convenience of mass-production and lower cost. The exact dimensions of detent elements will depend upon the anticipated magnitude of forces which tend to unscrew the nut 7 as well as upon the material of the sleeve 1 and the nut. Not only the sleeve 1 but the nut 7, too, can be made of a tough elastomeric plastic material. However, it is equally within the purview of the invention to make the sleeve 1 and/or the nut 7 from a suitable metallic material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer of said slots being offset with reference to the respective inner ends in the same direction circumferentially of said sleeve so that said slots are inclined relative to and are intersected by planes including the axis of said sleeve and extending between the inner and outer ends of the respective slots; and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least element cooperating with at least one of said prongs to oppose unscrewing of said nut, said at least one detent element being at least substantially, axially parellel to an adjacent slot and the inclination of said at least one detent element relative to the plane which intesects the adjacent slots, being substantially identical with that of the adjacent slot when said threaded portions mate.

2. The fitting of claim 1, wherein said nut has a central opening and said deforming surface is a substantially frustoconical surface which is disposed between said internally threaded portion and said opening and tapers toward said opening.

3. The fitting of claim 1, wherein said at least one detent element is inclined with reference to an adjacent slot in substantially undeformed condition of said prongs.

4. The fitting of claim 3, wherein said at least one detent element has a radially inner end and a radially outer end, said element and a plane including the inner end of said element and the axis of said nut making a first angle, a plane including the axis of said sleeve and the inner end of any one of said slots making with the respective slot a smaller second angle in substantially undeformed condition of said prongs.

5. The fitting of claim 1, wherein said surface has a plurality of detent elements.

6. The fitting of claim 1, wherein said surface has at least two detent elements having radially inner ends, a plane including the inner end of one of said at least two detent elements and the axis of said nut making a first angle with said one detent element and a plane including the inner end of the other of said at least two detent elements and the axis of said nut making a different second angle with said other element.

7. The fitting of claim 1, wherien at least one of said components consists of plastic material.

8. A fitting for tubes, cables and the like, comprising a sleeve including an externally threaded portion and an end portion having substantially axially extending deformable prongs and substantially axially extending slots alternating with said prongs; and a nut including an internally threaded portion arranged to mate with said externally threaded portion, said nut having an internal deforming surface operative to displace porticnsof said prongs substantially toward the axis of said sleeve in response to screwing said nut onto said sleeve, said surface having at least one recess which receives a portion of one of said prongs in response to attempted unscrewing of said nut.

9. The fitting of claim 5, wherein said nut has a blocking flank provided in said recess and engaging said one prong in response to attempted unscrewing of said nut.

10. A fitting for tubes, cables and the like, comprising a first component constituting a sleeve including an externally threaded portion and an end portion substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots; and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least oen of said prongs to oppose unscrewing of said nut, said at least one detent element being at least substantially axially parallel to an adjacent slot when and the inclination of said at least one detent element relative to the plane which intersects the adjacent slots, being substantially identical with that of the adjacent slot said threaded portions mate and said at least one detent element including a tooth having a blocking flank which penetrates into a slot between two neighboring prongs in response to attempted unscrewing of said nut.

11. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate, said at least one detent element constituting a recess and said nut having a blocking flank disposed in said recess and engaging the at least one prong in response to attempted unscrewing of said nut.

12. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate, said nut further having a blocking flank which is disposed in the region of said at least one detent element and engages the at least one prong in response to attempted unscrewing of said nut.

13. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate and said at least one detent element being inclined with reference to an adjacent slot in substantially undeformed condition of said prongs, said nut further having a blocking flank which is disposed in the region of said at least one detent element and engages said at least one prong in response to attempted unscrewing of said nut, said flank having a radially inner end and a plane including the radially inner end of said flank and the axis of said nut making with said flank a first angle, a plane including the axis of said sleeve and the inner end of any one of said slots making with the respective slot a second angle which is greater than said first angle in substantially undeformed condition of said prongs.

14. A fitting for tubes, cables and the like, comprising a first component constituting a sleeve including an externally threaded portion and an end portion having substantially axially xtending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate and said nut further having a blocking flank in the region of said at least one detent element, the height of said blocking flank varying in the radial direction of said nut.

15. The fitting of claim 6, wherein the height of said blocking flank increases in a direction toward the axis of said nut.

16. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate and said nut further having an undercut blocking flank in the region of said at least one detent element.

17. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate and said at least one detent element including a tooth having a blocking flank which engages the at least one prong in response to attempted unscrewing of said nut, said tooth further having a second flank and a top land between said flanks, said flanks converging toward each other in a direction from said surface toward said top land.

18. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate and said at least one detent element having a recess, said nut further having an undercut blocking flank provided in said recess and engaging the at least one prong in response to attempted unscrewing of said nut.

19. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate and said at least one detent element having a recess, said recess having a deepmost portion and said nut further having two flanks provided in said recess and converging toward each other in a direction toward the deepmost portion of said recess.

20. A fitting for tubes, cables and the like, comprising a first component constituting a sleeve including an externally threaded portion and an end portion having substantially axially extending deformable prongs and substantially axially extending slots alternating with said prongs, each of said slots having an inner radial end and an outer radial end and the outer ends of said slots being offset with reference to the respective inner ends in the same direction circumferentially of said sleeve so that said slots are inclined relative to and are intersected by a plane including the axis of said sleeve and extending between the inner and outer ends of the respective slots, and a second component constituting a nut including an internally threaded portion arranged to mate with said externally threaded portion, said nut having an internal deforming surface operative to displace portions of said prongs substantially toward the axis of said sleeve in response to screwing of said nut onto said sleeve, said surface having at least one detent element cooperating with at least one of said prongs to oppose unscrewing of said nut, said at least one detent element being at least substantially axially parallel to an adjacent slot and the inclination of said at least one detent element relative to the plane which intersects the adjacent slots, being substantially identical with that of the adjacent slot when said threaded portions mate, at least one of said components consisting of an elastomeric material.

* * * * *